(12) United States Patent
Kovács et al.

(10) Patent No.: US 9,692,907 B2
(45) Date of Patent: Jun. 27, 2017

(54) DEVICE AND METHOD FOR GSM CALL IDENTIFIER

(71) Applicant: TELEFONAKTIEBOLAGET L M ERICSSON (PUBL), Stockholm (SE)

(72) Inventors: Åkos Kovács, Stockholm (SE); Lars Johansson, Linkoping (SE); Paul Schliwa-Bertling, Ljungsbro (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 33 days.

(21) Appl. No.: 14/762,395

(22) PCT Filed: Jan. 22, 2013

(86) PCT No.: PCT/SE2013/050045
§ 371 (c)(1),
(2) Date: Jul. 21, 2015

(87) PCT Pub. No.: WO2014/116146
PCT Pub. Date: Jul. 31, 2014

(65) Prior Publication Data
US 2015/0365535 A1    Dec. 17, 2015

(51) Int. Cl.
*H04J 3/00* (2006.01)
*H04M 7/00* (2006.01)
(Continued)

(52) U.S. Cl.
CPC .......... *H04M 7/0075* (2013.01); *H04L 5/22* (2013.01); *H04L 45/74* (2013.01); *H04L 65/608* (2013.01);
(Continued)

(58) Field of Classification Search
CPC .... H04M 7/0075; H04L 45/74; H04L 65/608; H04L 5/22; H04L 69/22; H04L 69/04; H04W 92/12
See application file for complete search history.

(56) References Cited

U.S. PATENT DOCUMENTS 7,460,516 B1    12/2008  Smith et al.
2004/0076277 A1*  4/2004  Kuusinen ............ H04L 12/1822
                                                   379/202.01
(Continued)

FOREIGN PATENT DOCUMENTS

WO        2004017585 A2     2/2004
WO        2006053298 A1     5/2006
WO    WO 2009/117577 A1     9/2009

OTHER PUBLICATIONS

Digital cellular telecommunications system (Phase 2+); Base Station System—Media GateWay (BSS-MGW) interface; User plane transport mechanism (3GPP TS 48.103 version 8.0.0 Release 8). ETSI TS 148 103 V8.0.0 (Jan. 2009).
(Continued)

*Primary Examiner* — Clemence Han

(57) ABSTRACT

A network node for a GSM network, arranged to receive a TDMA frame comprising a plurality of timeslots, each of which comprises payload from one or more calls. The network node extracts payload from calls and to assigns the extracted payload a corresponding identifier identifying the call of the payload. The network node is also arranged to generate a data packet comprising the extracted payload from calls together with their corresponding identifier, and places the corresponding identifier in a header in the data packet. The network node is also arranged to transmit the data packet to another node in the GSM network.

24 Claims, 9 Drawing Sheets

(51) Int. Cl.
*H04L 5/22* (2006.01)
*H04L 12/741* (2013.01)
*H04W 92/12* (2009.01)
*H04L 29/06* (2006.01)

(52) U.S. Cl.
CPC .............. H04L 69/22 (2013.01); *H04L 69/04* (2013.01); *H04W 92/12* (2013.01)

(56) References Cited

U.S. PATENT DOCUMENTS

| | | | |
|---|---|---|---|
| 2007/0183377 A1* | 8/2007 | Hoole | H04W 92/12 |
| | | | 370/338 |
| 2007/0183423 A1 | 8/2007 | Passarella et al. | |
| 2009/0073959 A1* | 3/2009 | Xu | H04L 65/607 |
| | | | 370/352 |
| 2012/0113963 A1 | 5/2012 | Liberg et al. | |

OTHER PUBLICATIONS

Schulzrinne et al. RTP: A Transport Protocol for Real-Time Applications. Network Working Group Request for Comments: 3550 Columbia University. Obsoletes: 1889. Jul. 2003.

* cited by examiner

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, ... | | | | | | | | 20/40 | IP |
| Source Port, Dest Port=<MUX UDP Port>, Length, ... | | | | | | | | 8 | UDP |
| T=1 | Mux ID = (Destination UDP Port of non-multiplexed PDU)/2 | | | | | | | 2 | Multiplex Header |
| Length Indicator (LI) = n+4 | | | | | | | | 1 | |
| R | Source ID = (Source UDP Port of non-multiplexed PDU)/2 | | | | | | | 2 | |
| Sequence Number (SN) | | | | | | | | 1 | Compressed RTP Header |
| Time Stamp (TS) | | | | | | | | 2 | |
| M | Payload Type (PT) | | | | | | | 1 | |
| RTP Payload | | | | | | | | n | RTP Payload |
| Multiplex Header | | | | | | | | 5 | Multiplex Header |
| Compressed RTP Header | | | | | | | | 4 | Compressed RTP Header |
| RTP Payload | | | | | | | | m | RTP Payload |
| ... | | | | | | | | | |

Prior Art, RTP MUX

Fig. 3

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, ... | | | | | | | | 20/40 | IP |
| Source Port, Dest Port=<MUX UDP Port>, Length, ... | | | | | | | | 8 | UDP |
| T=1 | | | Mux ID = (Destination UDP Port of non-multiplexed PDU)/2 | | | | | 2 | Multiplex Header |
| Length Indicator (LI) = n+4 | | | | | | | | 1 | |
| R | | | Source ID = Call Identifier | | | | | 2 | |
| SID | R | R | Sequence Number (SN) | | | | | 1 | Compressed RTP Header |
| Time Stamp (TS) | | | | | | | | 2 | |
| M | | | Payload Type (PT) | | | | | 1 | |
| RTP Payload | | | | | | | | n | RTP Payload |
| Multiplex Header | | | | | | | | 5 | Multiplex Header |
| Compressed RTP Header | | | | | | | | 4 | Compressed RTP Header |
| RTP Payload | | | | | | | | m | RTP Payload |
| ... | | | | | | | | | |

Fig. 4

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, ... | | | | | | | | 20/40 | IP |
| Source Port, Dest Port=<MUX UDP Port>, Length, ... | | | | | | | | 8 | UDP |
| Version | | | P | X | CSRC Count | | | 1 | RTP Header |
| M | | Payload Type | | | | | | 1 | |
| Sequence Number | | | | | | | | 2 | |
| Time Stamp | | | | | | | | 4 | |
| SSRC | | | | | | | | 4 | |
| CSRC, max 15 | | | | | | | | nx4 | |
| RTP Payload (chunks from each CSRC) | | | | | | | | | RTP Payload |
| ... | | | | | | | | | |

Prior Art, RTP Mix

Fig. 5

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, ... ||||||||  20/40 | IP |
| Source Port, Dest Port=<MUX UDP Port>, Length, ... |||||||| 8 | UDP |
| Version || P | X | CSRC Count |||| 1 | RTP Header |
| M | Payload Type ||||||| 1 | |
| Sequence Number |||||||| 2 | |
| Time Stamp |||||||| 4 | |
| SSRC |||||||| 4 | |
| SID | Sequence Number ||||||| nx4 | CSRC |
| | Call Identifier ||||||| | |
| | Reserved ||||||| | |
| RTP Payload (chunks from each CSRC) |||||||| | RTP Payload |
| ... |||||||| | |

DEVICE AND METHOD FOR GSM CALL IDENTIFIER

TECHNICAL FIELD

The present invention discloses a network node for a GSM call identifier.

BACKGROUND

In GSM systems, the interface between a Base Transceiver Station, BTS, and its corresponding Base Station Controller, BSC is the Abis interface. The combination of a BTS and its corresponding BSC is often referred to as a BSS, Base Station Subsystem.

Transmission of traffic over the Abis interface has evolved from TDM-based solutions to solutions based on IP, Internet Protocol. In cases where the transport network used over the Abis interface is an IP-based one, various technologies are used in order to "translate" between TDM and IP. Such "translation technologies" often increase the complexity of the GSM system.

SUMMARY

It is an object of the invention to provide an improved and simplified way of communication over the Abis interface, and to also extend the addressing space of calls in the GSM system.

This object is obtained by means of a network node for a GSM network. The network node is arranged to receive a TDMA frame which comprises a plurality of timeslots, each of which timeslots comprises payload from one or more calls. The network node is arranged to extract payload from at least one of the calls and to assign the extracted payload from each of said at least one call a corresponding identifier which identifies the call of the payload.

The network node is also arranged to generate a data packet which comprises the extracted payload from the at least one call together with the corresponding identifier, and to place the corresponding identifier in a header in the data packet. The network node is also arranged to transmit the data packet to another node in the GSM network.

In embodiments of the network node, the data packet comprises an RTP, Real Time Transport Protocol, packet.

In embodiments, the network node is arranged to include information in said identifier which identifies the TDMA frame and the timeslot in the TDMA frame from which the payload was extracted, as well as information identifying the subrate indicator and Vamos subchannel of the timeslot in the TDMA frame from which the payload was extracted.

In embodiments of the network node, the TDMA frame is a GSM TRX.

In embodiments, the network node is arranged to also include a GSM SID, Silence Descriptor, in the header of the data packet.

In embodiments, the network node is a GSM BTS, Base Transceiver Station.

The object is also obtained by means of a network node for a GSM network. The network node is arranged to receive a data packet which comprises a header and payload. The network node is arranged to generate a TDMA frame using said header and payload, and the network node is also arranged to find and use an identifier in said header in order to associate the payload with a specific call in the GSM network and to place the payload in a timeslot in said TDMA frame associated with said specific call. The network node is also arranged to transmit said TDMA frame in a GSM cell.

In embodiments of the network node, the data packet is an RTP, Real Time Transport Protocol, packet.

In embodiments, the network node is arranged to find in said identifier a subrate indicator and a Vamos subchannel of the specific timeslot in the TDMA frame in which the payload should be placed, as well as information identifying the TDMA frame in the GSM cell.

In embodiments of the network node, the TDMA frame is a GSM TRX.

In embodiments, the network node is arranged to also find a GSM SID, Silence Descriptor, in the header of the data packet.

In embodiments, the network node is a GSM BTS, Base Transceiver Station.

The object is also obtained by means of a network node for a GSM network. The network node is arranged to receive a data packet which comprises payload and a header, and the network node is arranged to find and extract an identifier in the header, where the identifier identifies a specific call to which the payload belongs, and the network node is arranged to use the identifier in order to forward the payload within the GSM network In embodiments of the network node, the data packet is an RTP, Real Time Transport Protocol, packet.

In embodiments, the network node is arranged to also find a GSM SID, Silence Descriptor, in the header of the data packet.

In embodiments, the network node is a GSM BSC, Base Station Controller, or a MGw, Media Gateway.

The object is also obtained by means of a network node for a GSM network. The network node is arranged to receive speech data belonging to a specific call in a GSM cell and to generate and transmit to another node in the GSM network a data packet which comprises a payload and a header. The network node is also arranged to generate and place an identifier in the header, where the identifier identifies the specific call to which the payload belongs.

In embodiments of the network node, the data packet is an RTP, Real Time Transport Protocol, packet.

In embodiments, the network node is arranged to also place a GSM SID, Silence Descriptor, in the header.

In embodiments, the network node is arranged to transmit generated RTP packets as multiplexed RTP packets and to place the identifier to which the payload of each multiplexed RTP packet belongs in the multiplex header of the multiplexed RTP packet.

In embodiments, the network node is arranged to transmit generated RTP packets by means of RTP mixing, and to place the identifier of a payload in a CSRC, Contributing Source, field identifying the call of the payload.

In embodiments, the network node is a GSM BSC, Base Station Controller or a Media Gateway, MGw.

BRIEF DESCRIPTION OF THE DRAWINGS

The invention will be described in more detail in the following, with reference to the appended drawings, in which
FIGS. 2-7 show RTP packets.

DETAILED DESCRIPTION

Figure 1:
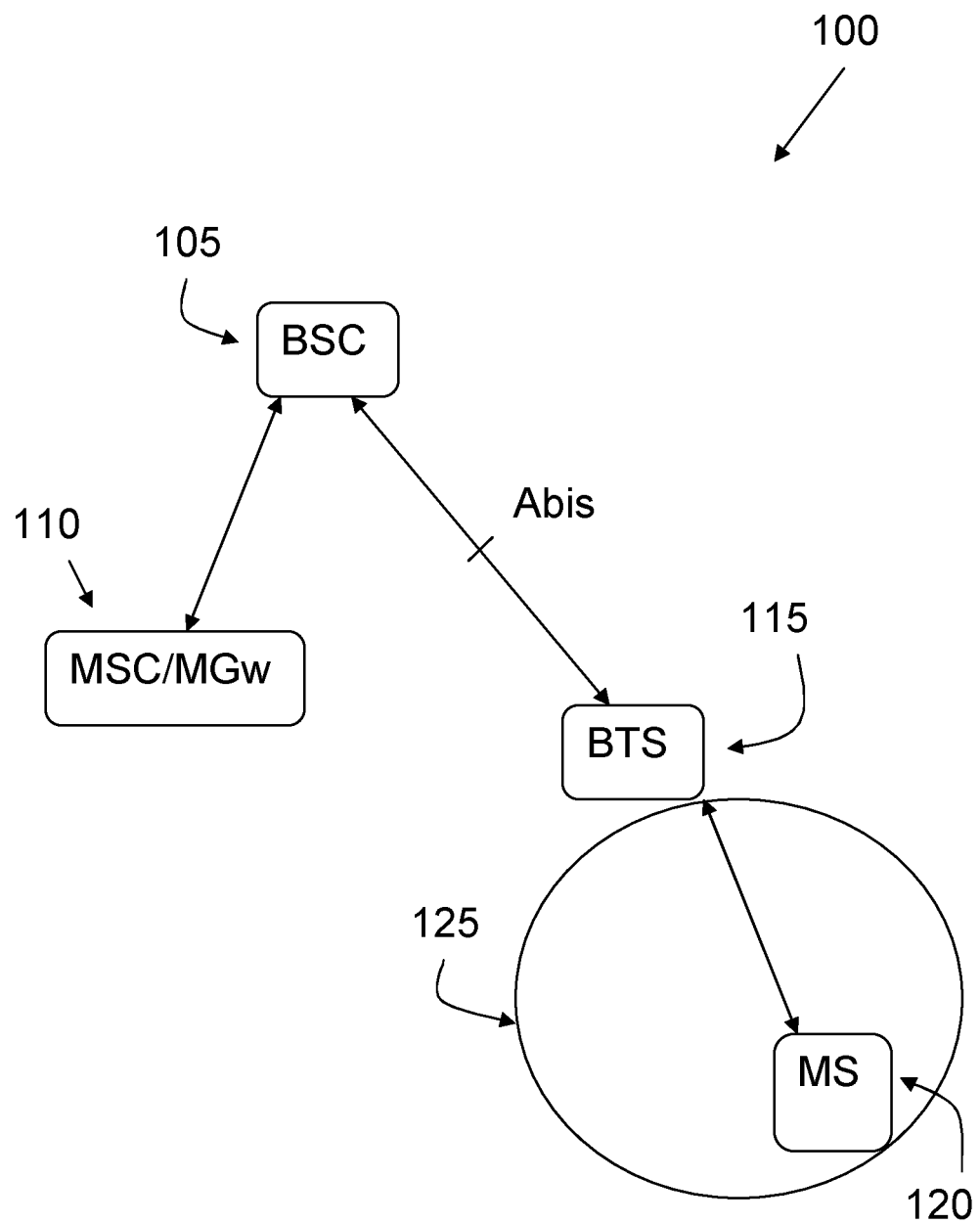
FIG. 1 shows a GSM network.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

In order to facilitate the understanding of the invention, FIG. 1 shows a part of a GSM network 100. The GSM network 100 comprises a number of cells 125, with each cell being able to accommodate a number of Mobile Stations, MSs, one of which is shown as 120 in FIG. 1. For each cell in the GSM network 100, there is a so called BSS, Base Station Subsystem, which comprises a Base Transceiver Station, abbreviated as BTS, shown as 115 in FIG. 1, and a Base Station Controller, a BSC, shown as 105 in FIG. 1. The BSS carries out control of the MSs in a cell, and all traffic to and from the MSs in a cell is routed via the BSS of the cell. As shown in FIG. 1, between the BTS and its BSC, there is the so called Abis interface. The BSC 105 is connected to a Mobile Switching Centre, an MSC, shown as 110 in FIG. 1. An MSC can comprise or be connected to a Media Gateway, an MGw.

Figure 2:
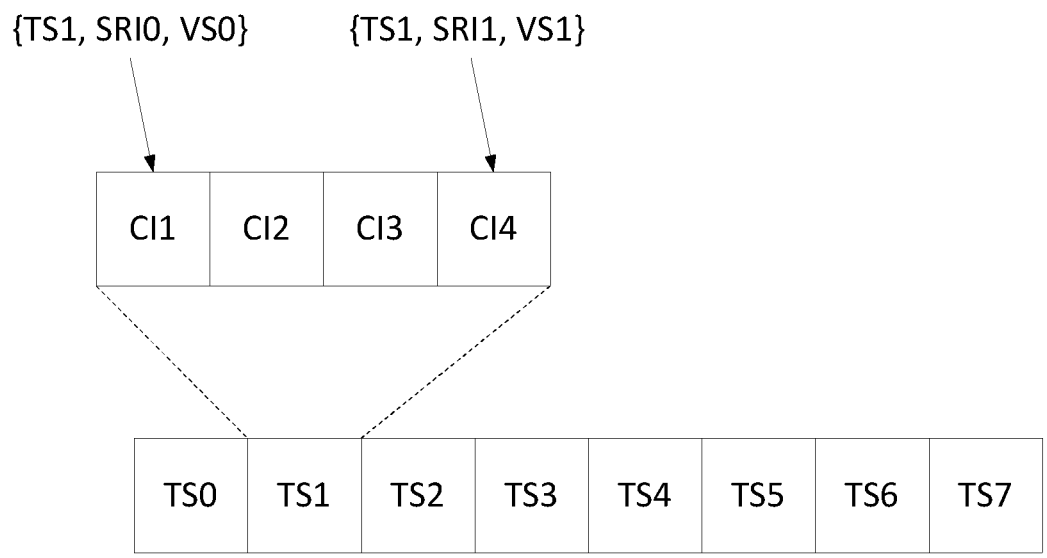

FIG. 2 shows a so called TRX, which is a TDMA frame which in turn comprises (in this example) eight contiguous timeslots, TS0-TS7. The eight timeslots that are comprised in a TRX can be transmitted on one and the same frequency, or the eight timeslots that are comprised in a TRX can be transmitted on different frequencies.

The BTS 115 transmits user data such as, for example, voice calls ("payload") from the MSs to the BSC and from the BSC to the MSs in the cell 125 on the timeslots in a TRX, and can handle a number of TRXs simultaneously, and data from the BSC to the MSs in the cell 125 is handled in a similar manner. Each timeslot in a TRX can carry N calls at the most, with N usually being 4: if the MSs in the cell 125 use so called half-rate codec, then calls from 2 mobiles can be placed in one timeslot in a TRX, so that there will be two "sub-timeslots" within each timeslot in a TRX. The position of a certain call within a timeslot is given by the so called SRI bit, SRI=SubRate Indicator, of the call. Furthermore, if the MSs in the cell 125 are VAMOS compatible, 2 calls can be placed in one "sub-timeslot", which enables four calls in one TRX timeslot. As shown in FIG. 2, with four calls in each timeslot in a TRX, each call is identified by the following parameters: TS which identifies the timeslot, SRI=SubRate Indicator, and VS, which is the Vamos sub-channel. As shown in FIG. 2, the first call in TS1 is thus identified by TS1, SRI0 and VS0, while the fourth call is identified by TS1, SRI1 and VS1. As we see, each call can be uniquely identified by the parameters TS, SRI and VS together with a parameter which identifies the TRX to which they belong, a parameter which will be designated "TRX" here, with an integer attached to it, i.e. TRX0-TRXN, if there are N+1 TRXs in a cell.

The four parameters TS, SRI, VS and TRX are combined into a Call Identifier, CI, for each call from an MS in a cell such as the one 125. The CI is used by one or more of the network nodes BTS, BSC and MSC/MGw in a manner which will be described below.

The BTS 115 is arranged to extract one or more calls from the TRX, and to assign an extracted call an identifier, i.e. the CI of the call. The BTS 115 also generates a data packet such as an RTP (Real Time Transport Protocol) packet which holds an extracted call as well as the CI of the extracted call. The BTS 115 is arranged to place the CI of an extracted call in the header of the data packet, i.e. in the case of RTP the BTS 115 places the CI in the RTP header. RTP packets will from now on be used in this text as a generic example of data packets.

Once an RTP packet has been generated by the BTS, the BTS is ready to transmit the RTP packet to another node in the GSM network 100, in this case the BSC 105. In versions which will be described later, the BTS 115 transmits the RTP Packets directly to the MGw, thereby bypassing the BSC 105.

Suitably, so called RTP header compression is applied by the BTS. In addition, although the generated RTP packets can be sent individually, in one embodiment so called RTP multiplexing ("MUX") is used. (One way of performing RTP MUX is described in "Digital cellular telecommunications system; Base Station System-Media GateWay (BSS-MGW) interface; User plane transport mechanism"; ETSI TS 148 103.)

FIG. 3 shows an example of prior art RTP multiplexing, where the compressed RTP header and the RTP payload can be seen. As can also be seen, the RTP packets which are multiplexed according to the prior art example of FIG. 3 are placed in UDP packets which in turn are placed in IP packets. This is preferably also the case when the CIs described above are used for RTP multiplexing.

In order to use the CIs described above, the CIs can, as an example, comprise 15 bits, used for the information elements TRX, TS, SRI and VS as follows:

TRX: 9 bits, in order to enable use of up to 512 TRXs
TS: 3 bits
SRI: 2 bits
VS: 1 bit Thus, in this example, the CI will comprise 15 bits, which is naturally only an example.

In embodiments, in addition to the CI, the RTP head also comprises the GSM Silence Descriptor, SID.

With reference to the prior art shown in FIG. 3 and amendments which could be made to the RTP header in order to enable the use of the CI and SID as described above, the CI could be encoded in the RTP Multiplex header, e.g. in the MUX ID field or in the Source ID field. In embodiments of an RTP packet, the Sequence Number field could be shortened to five bits, and the SID could be encoded to one of the free bits, while two bits are saved for future use.

An RTP packet with a header amended as described above is shown in FIG. 4, where amendments are shown in italics, with the exception of the shortened Sequence Number field.

Figure 6:

In another embodiment, so called RTP mixing (suitably as defined in IETF RFC 3550) is used in order to use the CIs and their corresponding payload. FIG. 5 shows a prior art RTP header (and payload) used for RTP mixing, again embedded in UDP and IP. When using RTP mixing, each call comprises a so called contributing source. Suitably, when using RTP mixing, a CSRC field, i.e. a Contributing Source field, in the RTP header identifying a source (i.e. a call) is encoded in such a way that the Sequence Number, SID and CI are embedded in the CSRC. One way of amending the RTP header of FIG. 5 to this end is shown in FIG. 6, with amendments being shown in italics. As we can see in FIG. 6, it is the CSRC field which carries the CI, as well as the Sequence Number and the SID. As can be seen, the RTP header of FIG. 6 comprises one Sequence Number field more than RTP header of FIG. 5. This Sequence Number field is not a must, but is suitable to use for sequence numbers for the individual payload data packed into the total RTP mixed packet.

Figure 7:
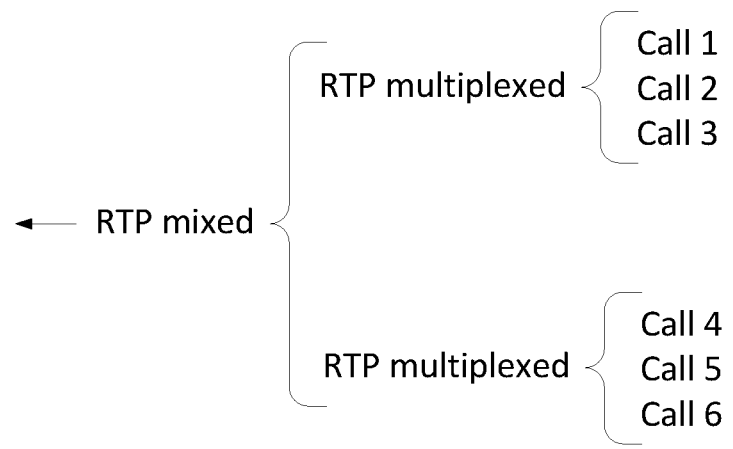

FIGS. 4 and 6 have been used to describe RTP multiplexing and RTP mixing. However, these two methods can also be combined, as indicated in FIG. 7. Thus, as shown in FIG. 7, two streams of RTP multiplexed packets, one of which contains calls 1-3 and the other comprises calls 4-6, can be mixed in the manner described in connection with FIG. 6. In other versions, two or more streams of RTP mixed packets can be multiplexed in the manner described in connection with FIG. 4.

In connection to FIGS. 4 and 6, it has been described how an RTP package which comprises the CI of one or more calls is generated from a TRX by the BTS. This can then be seen as handling of "uplink TRXs" by the BTS. We also disclose a BTS which is arranged to generate "downlink TRXs", i.e. to receive an RTP package which is configured as described in connection to FIGS. 4 and/or 6, and to generate one or more TRXs from such an RTP package. Naturally, in many cases one and the same BTS will be arranged both to handle uplink TRXs as describe above and to generate "downlink TRXs" as described in the following. A BTS which is arranged to generate "downlink TRXs" is then arranged to receive an RTP package which comprises a header and payload, and the BTS is arranged to generate a TDMA frame, in this example a TRX, by means of the RTP package's header and payload.

The BTS is also arranged to find and use the CI in the RTP packet's header in order to associate the payload in the RTP packet with a specific call in the GSM network, and to place the payload in a timeslot in the TRX which is associated with the specific call, i.e. in a timeslot which is used by that particular call, or in a sub-time slot in the case where more than one call is placed in one and the same timeslot, as shown in FIG. 2. This is then done by means of the information element TS in the CI. In addition, the BTS is also arranged to transmit the generated TRX in the GSM cell which the BTS handles.

As we have seen above, the CI suitably comprises the subrate indicator and Vamos subchannel of the call of the CI, so the BTS is arranged to find in the CI the subrate indicator and Vamos subchannel of the specific timeslot in the TRX in which the payload should be placed, i.e. the subrate indicator and the Vamos subchannel of the specific call, as well as information identifying the TRX in which the call should be placed.

As described above, the RTP packet suitably also comprises a GSM ID, which means that the BTS is suitably arranged to also find a GSM SID, Silence Descriptor, in the header of the data packet.

The BTS is also suitably arranged to receive multiplexed RTP packets and to find and extract the identifier of a payload from the multiplex header of said payload.

The BTS is also suitably arranged to receive RTP mixed RTP packets and to find and extract the CI of a payload from a CSRC field identifying the call of the payload.

In the case of RTP multiplexing and/or RTP Mixing, the BTS uses the extracted CI and payload of each individual call when generating TRXs, and to place each call in the correct timeslot and in the correct TRX.

With renewed reference to the "uplink TRXs", i.e. generating RTP packets towards the BSC from received TRXs, one possibility when multiplexing RTP packets is as follows: based on BSC-relayed and extended signaling from the MSC/MGw:s, BTSs are informed of which calls that are handled by one and the same MGw. The BTS uses this information in order to multiplex RTP packets which are destined to the same MGw, and the RTP payload is given the format (using the same RTP profile) that is used by the MGw. In this manner, RTP packets from a BTS can be transmitted straight to the MGw, so that the BSC is bypassed. A similar operation can be performed by the MGw: based on signaling information from the BSC directly or received via the MSC, the MGw can decide on how to multiplex traffic so that calls to one and the same BTS are multiplexed together, which can enable "bypass" of the BSC in the downlink direction, i.e. in the direction towards the BTS In embodiments, due to the above described changes in the Sequence Number field of the compressed RTP packet header, the MGw uses for sequence numbering only the 5 least significant bits of the "ordinary" (unamended) Sequence Number field, as the upper 3 bits are used for other purposes (SID indication). If RTP mixing is used, the method described above (addressing one and the same MGw) is not possible unless otherwise the mixed stream addresses the same MGw and the MGw itself can handle RTP mixing, which however requires changes in the MGw. However, RTP mixing could instead be based on how calls are handled by the MGw, which could save processing capacity in the BSC.

Figure 8:
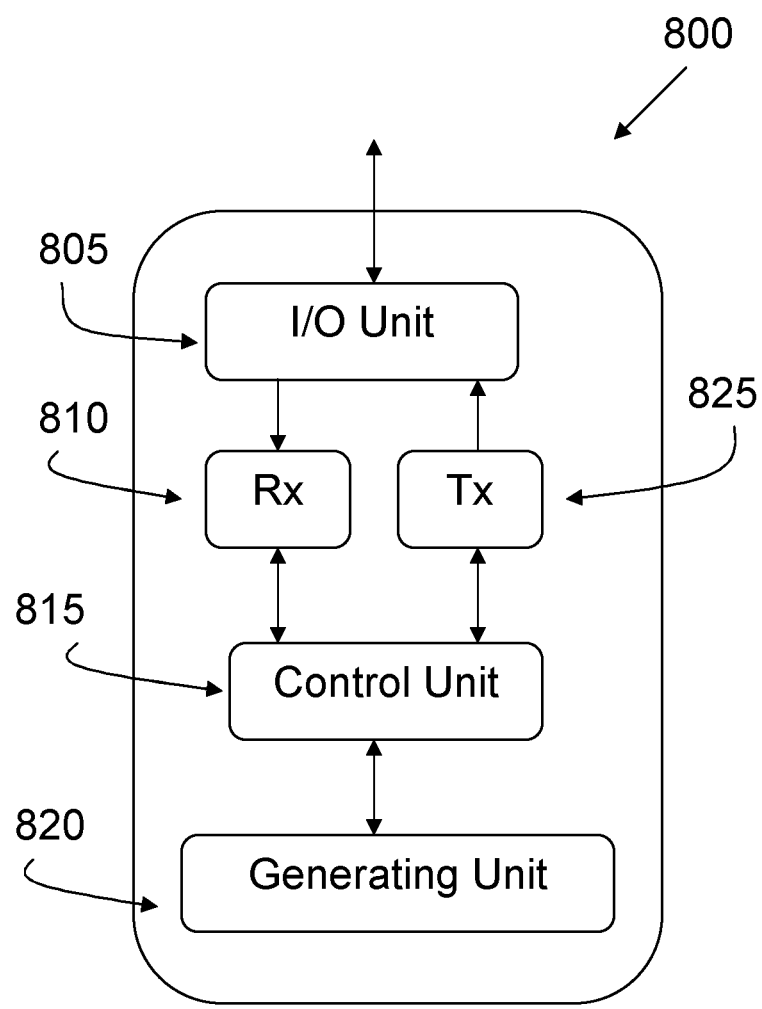
FIGS. 8 and 9 show network nodes.

FIG. 8 shows a block diagram of a generic network node 800 which can be either a BTS or a BSC, but which in the following description of FIG. 8 will be referred to as a "network node". The network node 800 can fulfill both "the uplink role" and "the downlink role", although it is possible to have separate nodes for these functions. The "uplink role" refers to generating RTP packets from TRXs as described above, and the "downlink role" refers to generating TRXs from RTP packets in the manner described above.

The network node 800 comprises an I/O-unit 805, which is used for interfacing with other nodes on the GSM system, and which can comprise an antenna unit. The network node 800 also comprises a Receive Unit ("Rx") 810 and a Transmit Unit ("Tx") 825, as well as a Control Unit 815 and a Generating Unit 820. The Control Unit 815 controls the general function of the other units, i.e. units 805, 810, 825, and 820. In the uplink role, it is the Generating Unit 820 which extracts payload from the calls and assigns the extracted payload a CI and which generates an RTP packet which comprises the extracted payload the calls together with their corresponding identifier and places the CI in a header in the RTP packet. Generated RTP packets are transmitted by means of the I/O-unit 805 and the Transmit Unit 825. It should be pointed out that the functions described above as being performed by the Generating Unit 820 can also in part be carried out by the Control Unit 815, so that the division of tasks between the units 815 and 820 given here is only an example.

In the downlink role, the network node 800 receives by means of the I/O-unit 805 and the Receive Unit 810 RTP packets which comprise a header and payload. By means of the Generating unit 820 and the Control Unit 815, the network node 800 generates a TRX by means of said header and payload, and by means of the Generating unit 820 and the Control Unit 815, the network node 800 also finds and uses a CI in said header in order to associate the payload with a specific call in the GSM network and places the payload in a timeslot in the TRX which is associated with the specific call. Generated TRXs are transmitted by means of the I/O-unit 805 and the Transmit Unit 825.

Above, the role of the BTS has been discussed with respect to generating TRXs from RTP packets or generating RTP packets from RTXs. However, the CI can also be used by a node such as the BSC or the MGw, which receives an RTP packet from the BTS and wants or needs to use, e.g. to forward, a call which has payload in the RTP packet. In order to handle this case, the BSC or MGw is arranged to receive an RTP packet comprising payload and a header, and to find and extract a CI in the header, where the CI identifies a specific call to which the payload belongs, and the BSC or MGw is arranged to use the CI in order to use, e.g. to forward within the GSM system, the specific call to which the payload belongs. In similarity to that described above, in embodiments, the BSC or MGw is also arranged to find a GSM SID, Silence Descriptor, in the header of the RTP packet.

In similarity to that described above, in embodiments, the BSC or MSC is arranged to receive multiplexed RTP packets and to find and extract the CI of a payload from the multiplex header of said payload.

In similarity to that described above, in embodiments, the BSC or MSC is arranged to receive RTP mixed RTP packets and to find and extract the CI of a payload from a CSRC field identifying the call of the payload.

In the case of multiplexed and/or mixed RTP packets, the BSC is arranged to use each CI and its associated call in the manner described above in order to use, e.g. to forward each specific call to within the GSM network.

Turning now to how a network node such as an MGw or BSC handles speech data which belongs to a specific call in the GSM network with respect to the CI, this is as follows: the network node (i.e. MGw or BSC) is arranged to receive speech data belonging to a specific call in a GSM cell, and to generate and transmit to another node in the GSM network, e.g. the BTS of the specific call, an RTP packet which comprises payload and a header. The payload comprises the speech data as such, and the network node is to generate and place the CI described previously in this document in the header, i.e. the CI identifies the specific call to which said payload belongs, and thereby also the TRX, the timeslot, the subrate indicator and Vamos subchannel, by means of comprising the information elements TRX, TS, SRI and VS as described previously in this text.

In addition, the network node (BSC or MGw) is in embodiments arranged to place a GSM SID, Silence Descriptor, in the header.

In addition, the network node (BSC or MGw) is in embodiments arranged to transmit generated RTP packets as multiplexed RTP packets and to place the CI to which the payload of each multiplexed RTP packet belongs in the multiplex header of the multiplexed RTP packet.

In addition, the network node (BSC or MGw) is in embodiments arranged to transmit generated RTP packets by means of RTP mixing, and to place the CI of a payload in a CSRC field identifying the call of the payload.

Figure 9:
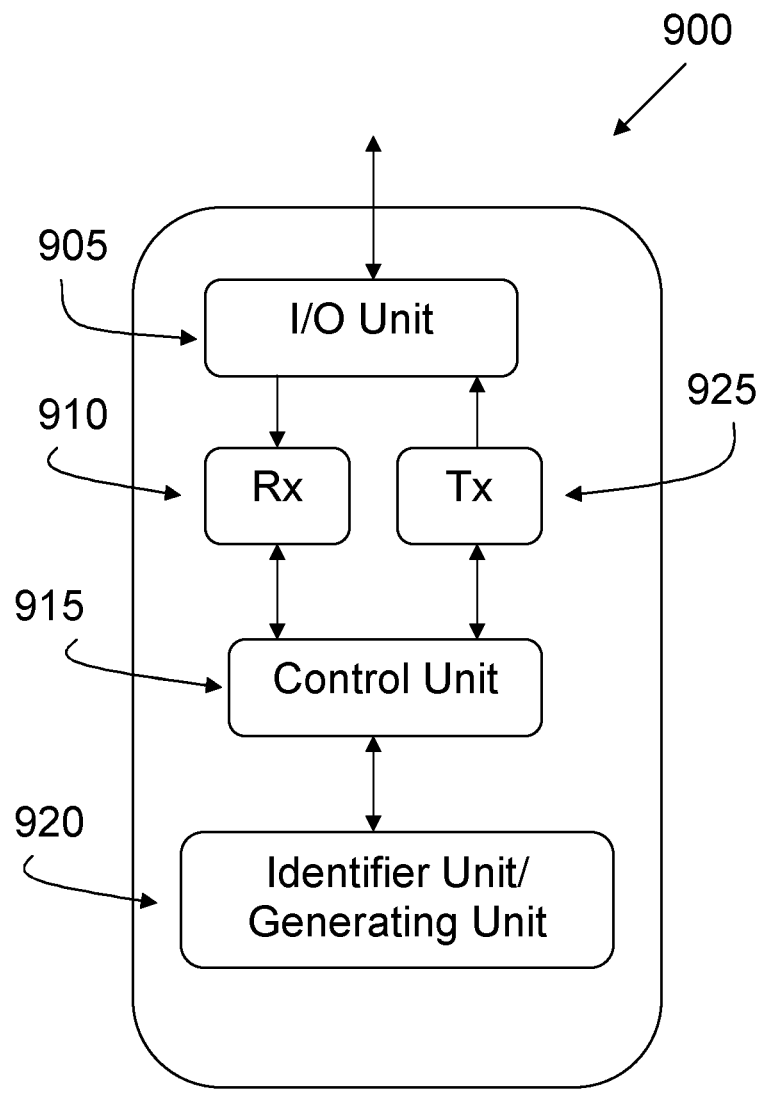

FIG. 9 shows a block diagram of a generic network node 900 which can be either a BSC or an MSC, but which in the following description of FIG. 9 will be referred to as a "network node".

The network node 900 comprises an I/O-unit 905, which is used for interfacing with other nodes on the GSM system, and which can comprise an antenna unit. The network node 900 also comprises a Receive Unit ("Rx") 910 and a Transmit Unit ("Tx") 925, as well as a Control unit 915 and an Identifier and Generating Unit 920. The control unit 915 controls the general function of the other units, i.e. units 905, 910, 925, and 920.

Although the division of tasks between the Control Unit 915 and the Identifier Unit 920 can be varied, one such solution will be described here. In "the uplink case", by means of the I/O-unit 905 and the receive unit 910, the network node 900 receives RTP packets which comprise payload and a header, and by means of the Control Unit 915 and the Identifier Unit 920, the network node 900 finds and extracts the CI in the header, where the CI identifies a specific call to which the payload belongs, and it is also by means of the Identifier Unit and Generating Unit 920 that the network node 900 can use the CI in order to address the specific call to which the payload belongs.

In "the downlink case", by means of the I/O-unit 905 and the receive unit 910, the network node 900 receives speech data which belongs to a specific call in a GSM cell and by means of the Identifier/Generating Unit it generates an RTP packet which comprises a payload and a header, and generates and places the CI in the header of the RTP packet, where the CI identifies the specific call to which the payload belongs.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A network node for a GSM network, the network node configured to:
   receive a TDMA frame comprising a plurality of timeslots, each of which timeslots comprises payload from one or more calls, extract payload from at least one of said calls and to assign the extracted payload from each of said at least one call a corresponding identifier identifying the call of the payload, wherein the identifier includes information which identifies the TDMA frame and the timeslot in the TDMA frame from which the payload was extracted, as well as information identifying the subrate indicator and Vamos subchannel of the timeslot in the TDMA frame from which the payload was extracted,
   generate a data packet comprising the extracted payload from said at least one call together with the corresponding identifier, and to place said corresponding identifier in a header in the data packet, and
   transmit said data packet to another node in the GSM network.

2. The network node of claim 1, in which the data packet comprises an RTP, Real Time Transport Protocol, packet.

3. The network node of claim 2 further configured to transmit generated RTP packets by means of RTP multiplexing, and to place said corresponding identifier of a payload in a multiplex header of said payload.

4. The network node of claim 2 further configured to transmit generated RTP packets by means of RTP mixing, and to place said corresponding identifier of a payload in a contributing source (CSRC) field identifying the call of the payload.

5. The network node of claim 1, in which the TDMA frame is a GSM TRX.

6. The network node of claim 1, being arranged further configured to also include a GSM SID, Silence Descriptor, in the header of the data packet.

7. A network node for a GSM network, the network node configured to:
   receive a data packet, which data packet comprises a header and payload,
   generate a TDMA frame using said header and payload, find and use an identifier in said header, the identifier comprising a subrate indicator and a Vamos subchannel of the specific timeslot in the TDMA frame in which the payload should be placed, as well as information identifying the TDMA frame in the GSM cell, the identifier used in order to associate the payload with a specific call in the GSM network and to place the payload in a timeslot in said TDMA frame which is associated with said specific call, and transmit said TDMA frame in a GSM cell.

8. The network node of claim 7, in which the data packet is an RTP, Real Time Transport Protocol, packet.

9. The network node of claim 7, in which the TDMA frame is a GSM TRX.

10. The network node of claim 7 further configured to also find a GSM SID, Silence Descriptor, in the header of the data packet.

11. The network node of claim 7 further configured to receive multiplexed RTP packets and to find and extract the identifier of a payload from a multiplex header of said payload.

12. The network node of claim 7 further configured to receive RTP mixed RTP packets and to find and extract said identifier of a payload from a contributing source (CSRC) field identifying the call of the payload.

13. The network node of claim 7, being a GSM BTS, Base Transceiver Station.

14. A network node for a GSM network, the network node configured to:
  receive a data packet comprising payload and a header,
  find and extract an identifier in said header, the identifier comprising a subrate indicator and a Vamos subchannel of the specific timeslot in the TDMA frame in which the payload should be placed, as well as information identifying the TDMA frame in the GSM cell, the identifier identifying a specific call to which said payload belongs, and
  use said identifier in order to forward the payload within the GSM network.

15. The network node of claim 14, in which the data packet is an RTP, Real Time Transport Protocol, packet.

16. The network node of claim 14 further configured to also find a GSM SID, Silence Descriptor, in the header of the data packet.

17. The network node of claim 14 further configured to receive multiplexed RTP packets and to find and extract the identifier of a payload from a multiplex header of said payload.

18. The network node of claim 14 further configured to receive TP mixed RTP packets and to find and extract said identifier of a payload from a contributing source (CSRC) field identifying the call of the payload.

19. The network node of claim 14, being a GSM BSC, Base Station Controller or a Media Gateway, MGw.

20. A network node for a GSM network, the network node configured to:
  receive speech data belonging to a specific call in a GSM cell and to generate and transmit to another node in the GSM network a data packet comprising a payload and a header,
  generate and place an identifier in said header, the identifier comprising a subrate indicator and a Vamos subchannel of the specific timeslot in the TDMA frame in which the payload should be placed, as well as information identifying the TDMA frame in the GSM cell, the identifier identifying the specific call to which said payload belongs.

21. The network node of claim 20, in which the data packet is an RTP, Real Time Transport Protocol, packet.

22. The network node of claim 21 further configured to transmit generated RTP packets as multiplexed RTP packets and to place the identifier to which the payload of each multiplexed RTP packet belongs in a multiplex header of the multiplexed RTP packet.

23. The network node of claim 21, further configured to transmit generated RTP packets by means of RTP mixing, and to place the identifier of a payload in a contributing source (CSRC) CSRC field identifying the call of the payload.

24. The network node of claim 20 further configured to also place a GSM SID, Silence Descriptor, in the header.

* * * * *